(12) United States Patent
Shimura et al.

(10) Patent No.: US 6,486,981 B1
(45) Date of Patent: Nov. 26, 2002

(54) COLOR IMAGE PROCESSING METHOD AND APPARATUS THEREOF

(75) Inventors: Norio Shimura; Mitsuru Maeda, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/887,426

(22) Filed: Jul. 2, 1997

Related U.S. Application Data (63) Continuation of application No. 08/733,456, filed on Oct. 18, 1996, now abandoned, which is a continuation of application No. 08/275,255, filed on Jul. 15, 1994, now abandoned.

(30) Foreign Application Priority Data

Jul. 27, 1993 (JP) .............................. 5-184669
Jun. 24, 1994 (JP) .............................. 6-142794

(51) Int. Cl.[7] .............................. H04N 1/46; H04N 1/41
(52) U.S. Cl. .................. 358/500; 358/426; 358/433; 382/166
(58) Field of Search .................. 358/500, 501, 358/520, 524, 530, 426, 427, 432, 433, 443, 445, 448; 382/199, 166

(56) References Cited

U.S. PATENT DOCUMENTS

| | | | |
|---|---|---|---|
| 5,189,530 A | 2/1993 | Fujii | 358/458 |
| 5,220,417 A | 6/1993 | Sugiura | 358/75 |
| 5,253,078 A * | 10/1993 | Balkanski et al. | 358/426 |
| 5,301,040 A | 4/1994 | Hoshi et al. | 358/465 |
| 5,341,318 A * | 8/1994 | Balkanski et al. | 358/427 |
| 5,383,037 A * | 1/1995 | Kimura et al. | 358/520 |
| 5,488,670 A * | 1/1996 | Suzuki et al. | 382/199 |

FOREIGN PATENT DOCUMENTS

| | | | |
|---|---|---|---|
| JP | 04323964 A | 11/1992 | H04N/1/41 |
| JP | 05048909 A | 2/1993 | H04N/1/41 |
| JP | 05284371 A | 10/1993 | H04N/1/415 |
| JP | 07046410 A | 2/1995 | H04N/1/41 |
| JP | 07050758 A | 2/1995 | H04N/1/41 |
| JP | 7143349 A | 6/1995 | H04N/1/415 |
| JP | 07193838 A | 7/1995 | H04N/11/04 |

* cited by examiner

*Primary Examiner*—Thomas D. Lee
(74) *Attorney, Agent, or Firm*—Fitzpatrick, Cella, Harper & Scinto (57) ABSTRACT

A color image processing apparatus which codes image data while suppressing image deterioration. A color character area discrimination unit divides an input color image into 16×16-pixel blocks, and determines whether or not each block expresses color characters. In accordance with the determination result, a sub-sampling ratio switching unit switches the sampling ratio for each of color components YCrCb composing the color image data so that the sample ratio is Y:Cr:Cb=4:2:2 or Y:Cr:Cb=4:1:1. Subsequently, sampling is performed in accordance with the switched sampling ratio, and DCT, linear quantization and entropy coding are then performed.

8 Claims, 9 Drawing Sheets

COLOR IMAGE PROCESSING METHOD AND APPARATUS THEREOF

This application is a continuation of application Ser. No. 08/733,456 filed Oct. 18, 1996, now abandoned, which was a continuation of application Ser. No. 08/275,255 filed Jul. 15, 1994, now abandoned.

BACKGROUND OF THE INVENTION

This invention relates to a color image processing method and apparatus and, more particularly, to a color image processing method and apparatus capable of coding and storing color image data.

A conventional highly efficient compression coding scheme that is well known and developed for the international standardization is, the JPEG scheme (The Journal of the Institute of Image Electronics Engineers of Japan, Vol. 20, No. 1, 1991, pp. 50–58).

Figure 9:
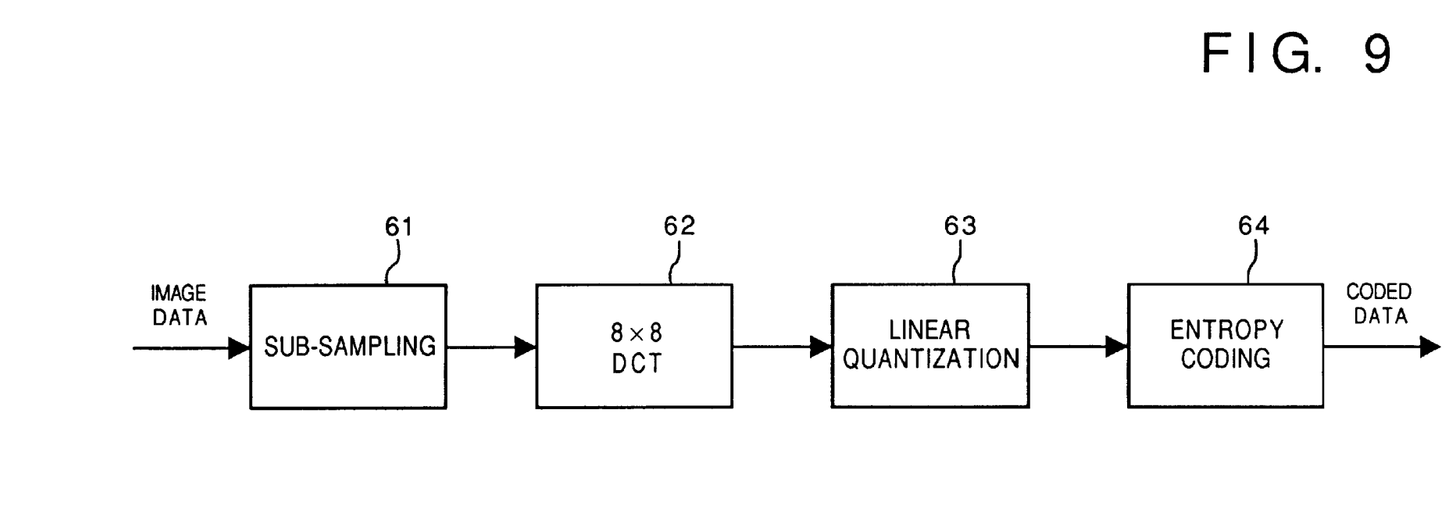
FIG. 9 is a diagram illustrating processing in a conventional image compression and coding scheme.

FIG. 9 is a block diagram illustrating a general processing procedure of the JPEG scheme.

In the JPEG scheme, first, input image data is subject to sampling, and divided into 8×8 pixel-blocks. Subsequently, each block is subject to a two dimensional discrete cosine transform (hereinafter, referred to as "DCT") (8×8 DCT 62 in FIG. 9). The obtained 8×8 DCT coefficients are subject to linear quantization at the step size based on the position of each coefficient with reference to a quantization table (8×8 coefficients) (Linear quantization 63 in FIG. 9). Finally, the quantized DCT coefficients are subjected to a Huffman transform. That is, on the DC coefficient, the difference with the DC coefficient of the preceding block is calculated. On the other hand, a zigzag-scan on the AC coefficients is performed to convert the two-dimensional values into one-dimensional values, an entropy coding (two dimensional coding) is performed by a pair of the run length of the zero coefficient and non-zero coefficient (Entropy coding 64 in FIG. 9), and the obtained code is output as coded data.

Figure 10A:
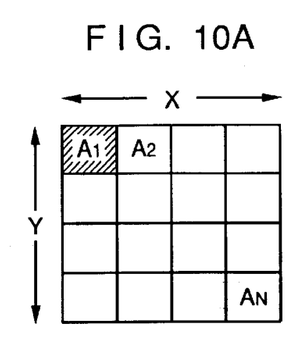
FIGS. 10A–10C are diagrams illustrating an image lock where the sub-sampling is not performed on the A, B and C components of a color space representing an image.
Figure 10B:
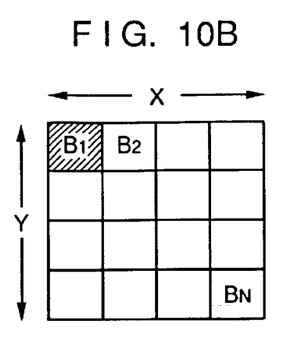
Figure 10C:
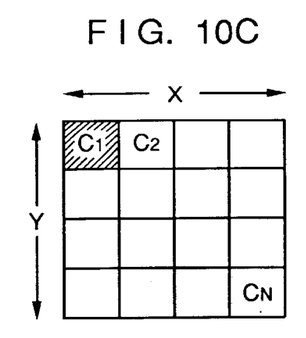

When the input image data is expressed in a color space (A, B, C), various expressing manners are provided for each color component. For example, pixels of each color component can be expressed as follows:

(1) When each of A, B, C components is composed of X×Y pixels,

[No sub-sampling]; refer to FIGS. 10A–10C.

Figure 11A:
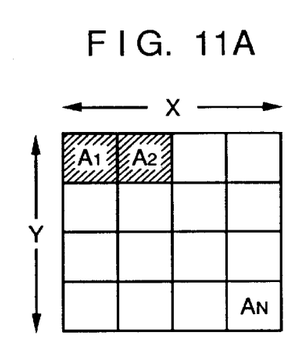
FIGS. 11A–11C are diagrams illustrating an image block where the sub-sampling is performed at the sub-sampling ratio A:B:C=4:2:2.
Figure 11B:
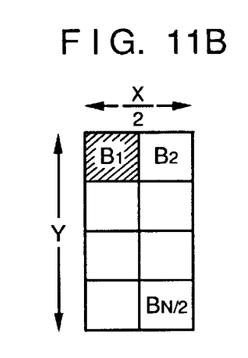
Figure 11C:
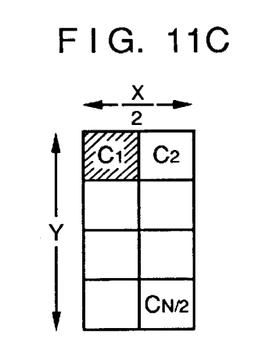

(2) When the A component is composed of X×Y pixels, and each of the B and C components are composed of (X/2)×Y pixels, on which ½ sub-sampling is performed in the horizontal (X) direction,

[Sub-sampling ratio: A:B:C=4:2:2], refer to FIGS. 11A–11C.

Figure 12A:
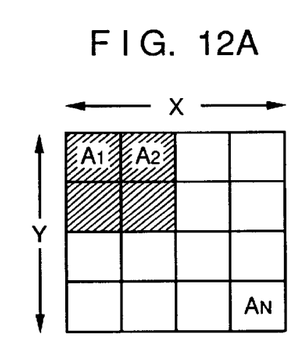
FIGS. 12A–12C are diagrams illustrating an image block where the sub-sampling is performed at the sub-sampling ratio A:B:C=4:1:1.
Figure 12B:
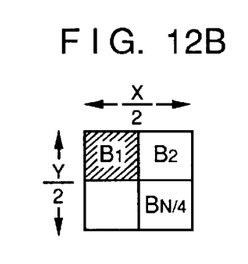
Figure 12C:
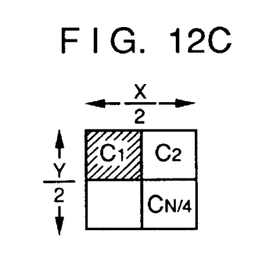

(3) when the A component is composed of X×Y pixels, and each of the B and C components are composed of (X/2)×(Y/2) pixels, on which the ½ sub-sampling is performed both in the horizontal (X) and vertical (Y) directions,

[Sub-sampling ratio: A:B:C=4:1:1], refer to FIGS. 12A–12C.

Sub-sampling is performed by using an arbitrary sub-sampling ratio in the above (Sub-sampling 61 in FIG. 9), and then, the process following the DCT is performed.

When the sub-sampling ratio is 4:2:2 (FIGS. 11A–11C), four blocks of the A component, two blocks of the B component and two blocks of the C component correspond to the same image area, respectively. If the B and C components do not severely effect the visual image, a more efficient coding can be performed by changing the sub-sampling ratio to A:B:C=4:1:1.

In the prior art, when the sub-sampling is performed in consideration of a visual characteristic, efficient coding can be performed on an overall image. However, a negative influence such as a partial image deterioration may result.

For example, when the color space of the input image data is YCbCr and the sub-sampling ratio is Y:Cb:Cr=4:1:1, if the data which is coded after the sub-sampling is decoded, a problem arises in that deterioration of image quality becomes great in more important portions of color information, such as a color character portion, in comparison with the portion of the monochromatic character and the natural picture image portions. Another problem is such that efficiency in coding color image data which includes a black/white portion is not so good if a color image coding scheme is applied to both the color and black/white portions.

SUMMARY OF THE INVENTION

Accordingly, it is an object of the present invention to provide a color image processing apparatus capable of compressing an image by efficiently coding the image in which image deterioration is suppressed by utilizing advantages of sub-sampling.

According to the present invention, the foregoing object is attained by a color image processing apparatus comprising: input means for inputting color image data; discrimination means for dividing the color image data input by the input means into a plurality of blocks, and discriminating whether or not each of the plurality of blocks is a block having a predetermined color characteristic; sampling means for sampling the color image data included in each of the plurality blocks by changing the sampling rate; and first coding means for coding the color image data which are sampled by the sampling means.

It is another object of the present invention to provide a color image processing method capable of efficiently coding an image in which image deterioration is suppressed by utilizing advantages of sub-sampling.

According to the present invention, the foregoing object is attained by a color image processing method comprising: an input step for inputting color image data; a discrimination step for dividing the color image data input by the input step into a plurality of blocks, and discriminating whether or not each of the plurality of blocks having a predetermined color characteristic; a sampling step for sampling the color image data included in each of the plurality of blocks by changing the sampling rate; and a coding step for coding the color image data which are sampled by the sampling step.

In accordance with the present invention as described above, before the coding of color image data, the input color image data is divided into a plurality of blocks, whether or not each block is a block having a predetermined characteristic is discriminated, the sampling rate is changed based on the discrimination result, and a sampling is performed on the color image data included in the block.

It is another object of the present invention to provide a color image processing apparatus capable of compressing an image by efficiently coding the image in which the deterioration is suppressed in accordance with he type of the block input image.

According to the present invention, the foregoing object is attained by a color image processing apparatus comprising: input means for inputting color image data; discrimination means for dividing the color image data input by the input means into a plurality of blocks, and discriminating whether each of the plurality of blocks is a block expressing a multichromatic image or a monochromatic image; and first coding means for coding the color image data based on the discrimination result by the discrimination means.

It is another object of the present invention to provide a color image processing method capable of efficiently coding an image in which the image deterioration is suppressed in accordance with the type of the block input image.

According to the present invention, the foregoing object is attained by a color image processing method comprising: an input step for inputting color image data; a discrimination step for dividing the color image data input by the input step into a plurality of blocks, and discriminating whether each of the plurality of blocks is a block expressing a multichromatic image or a monochromatic image; a first coding step for coding the color image data based on the result of the discrimination step.

The invention is particularly advantageous since coded data in which deterioration of image quality is suppressed can be obtained in consideration with the color characteristic of the image, since before the coding of color image data, the input color image data is divided into a plurality of blocks, whether or not each block is a block having a predetermined characteristic is discriminated, the sampling rate is changed based on the discrimination result, and a sampling is performed on the pixels included in the block.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

COMMON EMBODIMENT (FIG. 1)

Figure 1:
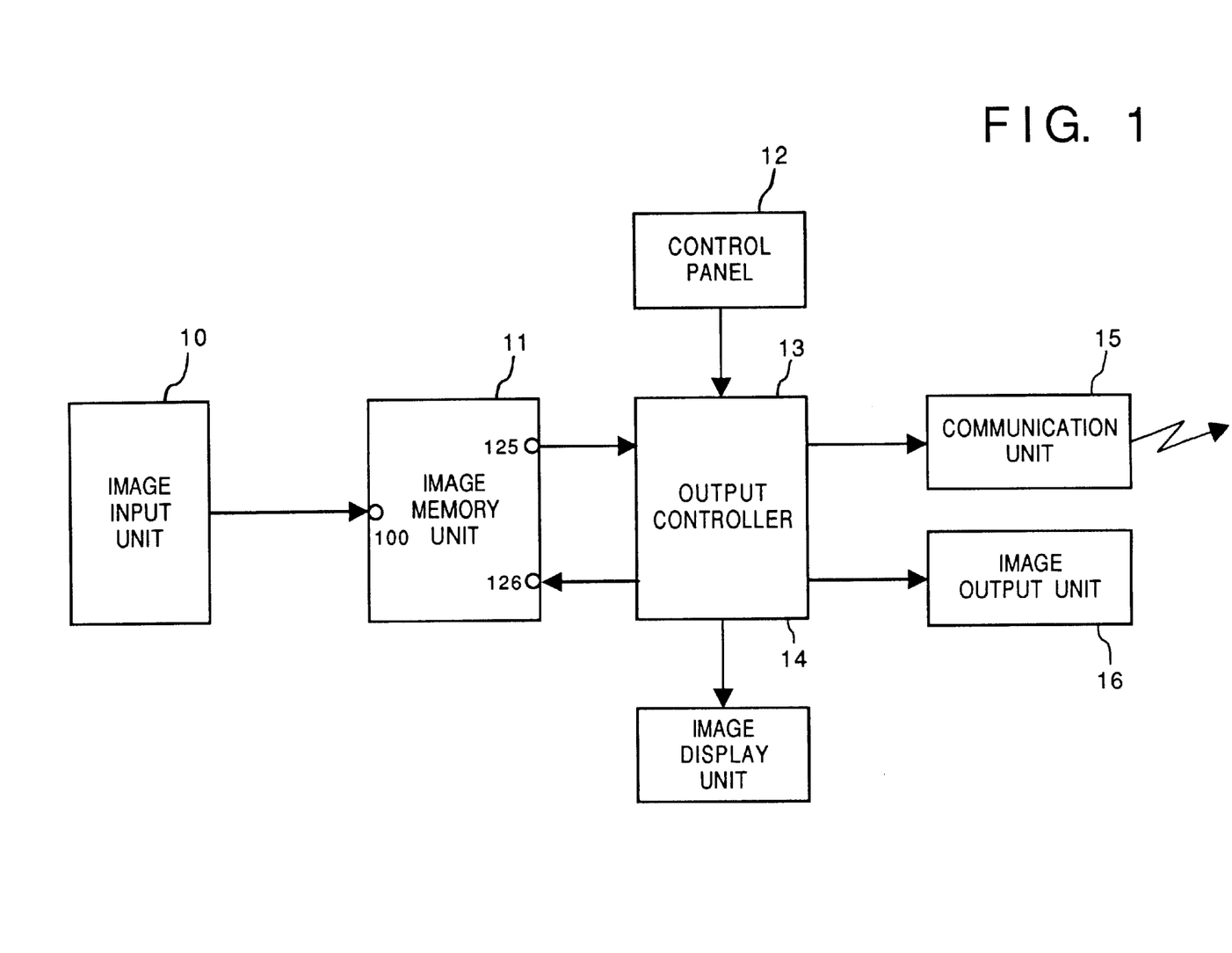
FIG. 1 is a block diagram illustrating the construction of the image processing apparatus which is a typical embodiment of the invention.

FIG. 1 is a block diagram illustrating the overall construction of an image processing apparatus representing a typical embodiment of the present invention.

As shown in FIG. 1, the apparatus includes an image input unit 10 constituted by an image reader such as an image scanner which includes a CCD sensor, or an interface of an external item of equipment such as a host computer, a SV camera or a video camera, etc. Image data input from the image input unit 10 is supplied to an input terminal 100 of an image memory unit 11, which is illustrated in detail in FIG. 2. The apparatus further includes a control panel 12 which an operator uses to designate an output destination of the image data, and an output controller 13. The control panel 12 is for selecting the output destination of the image data and inputting control information for coding an image, and the output controller 13 executes a specific processing in response to a synchronizing signal for memory read-out or connection information. The synchronizing signal is an ITOP signal from a printer engine, and the connection information, which conforms to the image output unit (printer resolution), is entered manually from the control panel 12, or is received from the image output unit 16. The image memory unit 11 has an output terminal 125 and an input terminal 126 for receiving a synchronizing signal from the output controller 13. The apparatus is further provided with an image display unit 14. Numeral 15 denotes a communication unit for transmitting/receiving the image data via a public line or a LAN (local area network). The image output unit 16 is, for example, a laser beam printer which irradiates a photosensitive body with a laser beam to form a latent image and then converts the latent image into a visible image. The image output unit 16 may be an ink-jet printer, a thermal printer or a dot printer, etc. Particularly, the image output unit 16 can be a bubble-jet type printer which ejects an ink droplet, utilizing film-boiling caused by thermal energy.

First Embodiment

In this embodiment, it is assumed that the color space of the input image data is YCbCr. An example of improving image quality is considered in the case where deterioration of a color character area in particular stands out when encoded at the sub-sampling ratio Y:Cb:Cr=4:1:1 in accordance with the prior art.

Figure 2:
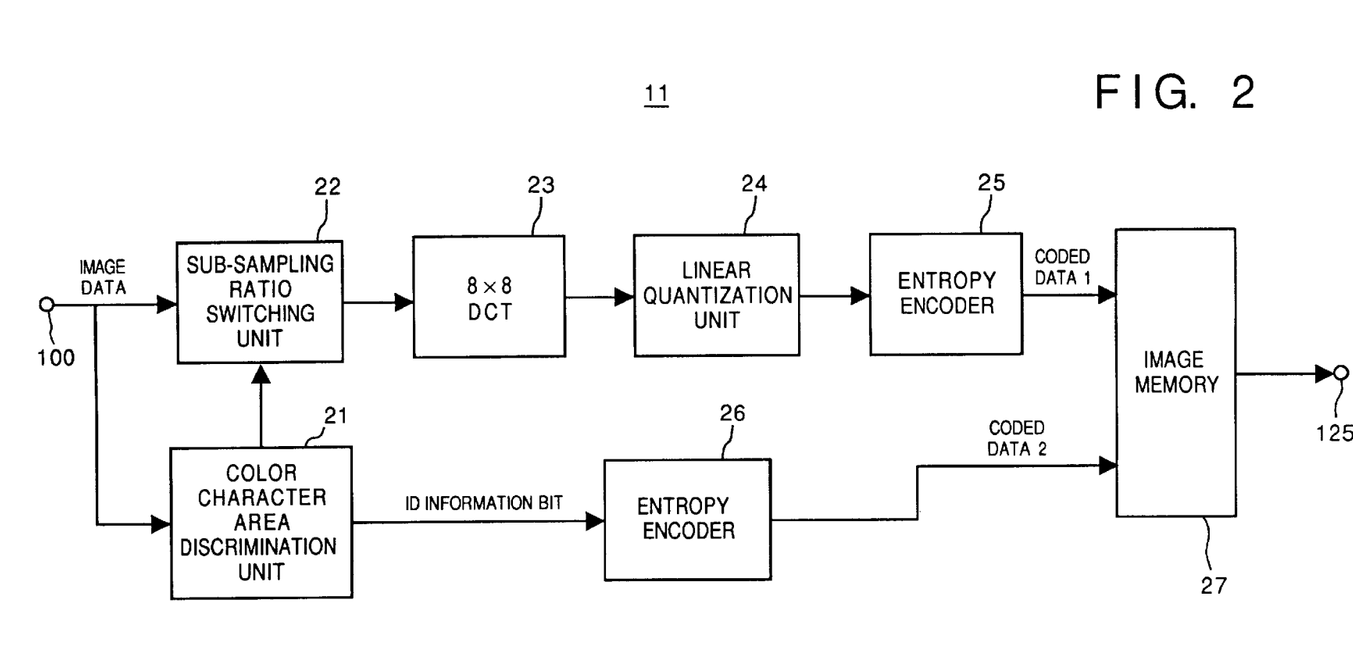
FIG. 2 is a block diagram illustrating the detail construction of the image memory unit 11 of FIG. 1 in accordance with a first embodiment.

FIG. 2 is a block diagram illustrating the construction of the image memory unit 11 shown in FIG. 1 in accordance the present embodiment.

In FIG. 2, numeral 21 denotes a chromatic character area discrimination unit for dividing the image data supplied to the input terminal 100 into 16×16-pixel areas, each of which is composed of four DCT blocks (each block is composed of 8×8 pixels), and discriminates whether or not each of the areas is a chromatic character area, numeral 22 denotes a sub-sampling ratio switching unit for switching the sub-sampling ratio between Y:Cb:Cr=4:2:2 (for a chromatic character area) and Y:Cb:Cr=4:1:1 (for an area other than a chromatic character area), numeral 23 denotes a DCT unit for performing DCT in the unit of an 8×8-pixel block, and numeral 24 denotes a linear quantization unit. Numeral 25 denotes an entropy coding unit for respectively performing an entropy coding on the DC component and AC components of the quantized DCT coefficients, and numeral 26 denotes an entropy coding unit for performing entropy coding, by using a binary lossless coding scheme (e.g., MMR), on the result of whether or not a 16×16-pixel area is a chromatic character area, and numeral 27 denotes an image memory for storing the coded data.

The operation of the image memory unit having the construction of FIG. 2 is described below.

The chromatic character area discrimination unit 21 divides the image data supplied to the input terminal 100 into 16×16-pixel areas, and discriminates whether or not each area is a chromatic character area.

Figure 3:
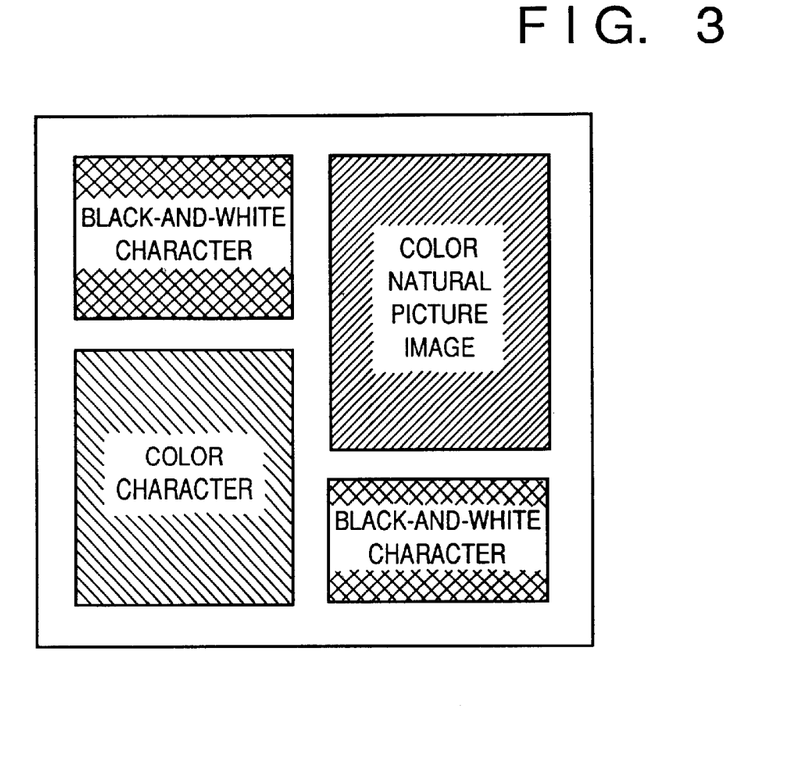
FIG. 3 is a diagram illustrating an example of an image whose areas are structured in advance.

The following schemes are examples for discrimination of chromatic character area:

(1) Scheme for discriminating the area as a chromatic character area when the number of times of black-and-white inversion is more than a threshold (T) (for the discrimination of the character portion) in the case where Y component is binarized (Note that a binary threshold is adaptively determined with reference to a histogram) and scanned in the horizontal direction of an area and the values of Cb and Cr components in the area have same color information;

(2) Scheme which uses Laplacian of Y component or a differential filter for discriminating a character portion; and (3) Scheme for providing information such as a chromatic character area by a preparation processing such as manual input or the like as shown in FIG. 3.

According to one of the above schemes, in the sub-sampling ratio switching unit 22, the sub-sampling ratio is changed to Y:Cb:Cr=4:2:2 on the area discriminated as a chromatic area. As shown in FIGS. 11A–11C, 8×8-pixel DCT is performed on four blocks of Y component, two blocks of Cb component and two blocks of Cr component. On the area discriminated as a non-chromatic character area, the sub-sampling ratio is maintained as 4:1:1. As shown in FIGS. 12A–12C, the 8×8-pixel DCT is performed on four blocks of Y component, one block of Cb component and one block of Cr component.

Figure 4:
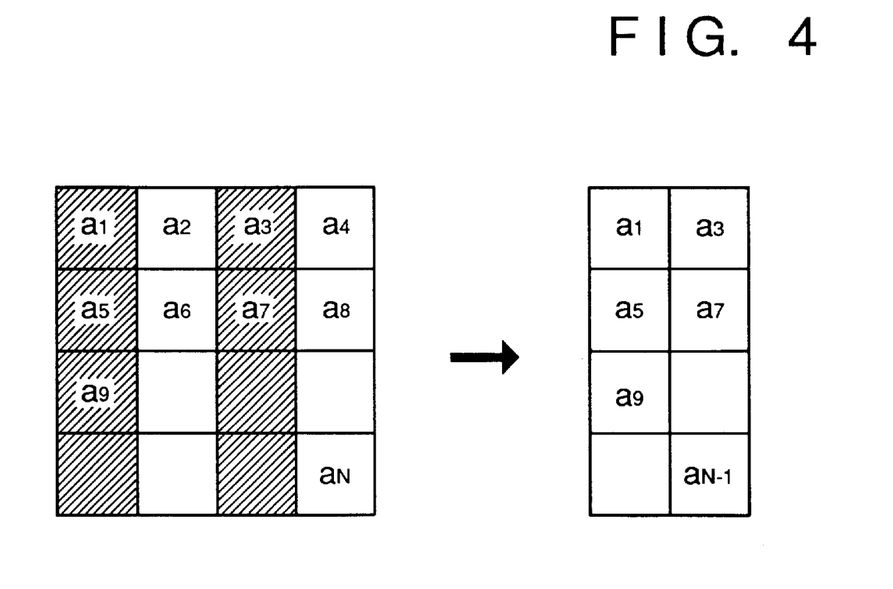
FIG. 4 is a diagram showing the state where image data is sampled at the rate of ½ in the horizontal direction.

The sampling in this case is such that pixels are picked up by alternate pixel with respect to the horizontal direction as shown in FIG. 4 or two neighboring pixels can be averaged.

Accordingly, after the sub-sampling, when DCT coefficients are obtained by the DCT, they are quantized by using a quantization table in accordance with the conventional technique. The quantized values are subject to the entropy coding in the unit of DC component and AD components, and finally, the coded data 1 is obtained.

The chromatic character discrimination unit 21 outputs the result of discrimination as to whether or not the 16×16-pixel area is a chromatic character area as an identification (ID) information bit (for example, if the value is "1", it indicates that the area is a chromatic character area, while if the value is "0", it indicates another information). In this case, the ID information bit is subject to the entropy coding by using a binary lossless coding scheme (e.g., MMR), and output as a coded data 2. Accordingly, the increase of the code amount by adding the ID information bit can be avoided.

The coded data generated in this way is stored in the image memory 27.

According to this embodiment, the coding processing is performed such that a chromatic character area is determined from the input image data, and sub-sampling is performed by adaptively switching the sub-sampling ratio between 4:2:2 (for the chromatic character area) and 4:1:1 (for the other area). Accordingly, the important Cb, Cr information for expressing colors can be provided for the chromatic character area. Thus, deterioration of image quality in the chromatic character portion can be suppressed, and efficient coding can be realized.

In the embodiment, YCbCr is used for the color space of the input image data, however, this does not impose a limitation upon the invention. For example, another color space such as RGB can be used. Furthermore, the chromatic character area is used for switching the sub-sampling ratio, however, this does not impose a limitation upon the invention.

Furthermore, in the embodiment, the sub-sampling ratio is switched between 4:1:1 and 4:2:2, however, this does not impose a limitation upon the invention. For example, the ratio can be 4:4:4 or other ratio.

Still further, in the embodiment, the area size for switching the sub-sampling ratio is composed of 16×16-pixel area including four blocks of 8×8 pixels for DCT. However, this does not impose a limitation upon the invention. For example, the area size can be larger or smaller than the above size. The DCT block is defined as 8×8 pixels, however, the size is not restricted to this example. Furthermore, DCT is used for the orthogonal transform in the embodiment, however, other transform such as a Hadamard transform can also be used.

Second Embodiment

In the embodiment, the input image whose color space is expressed by YCbCr is separated into a monocolor area and a color area. The coding is performed on the monocolor area by restricting color information. On the color area, a sub-sampling is performed at the sub-sampling ratio Y:Cb:Cr=4:2:2 before the coding.

Figure 5:
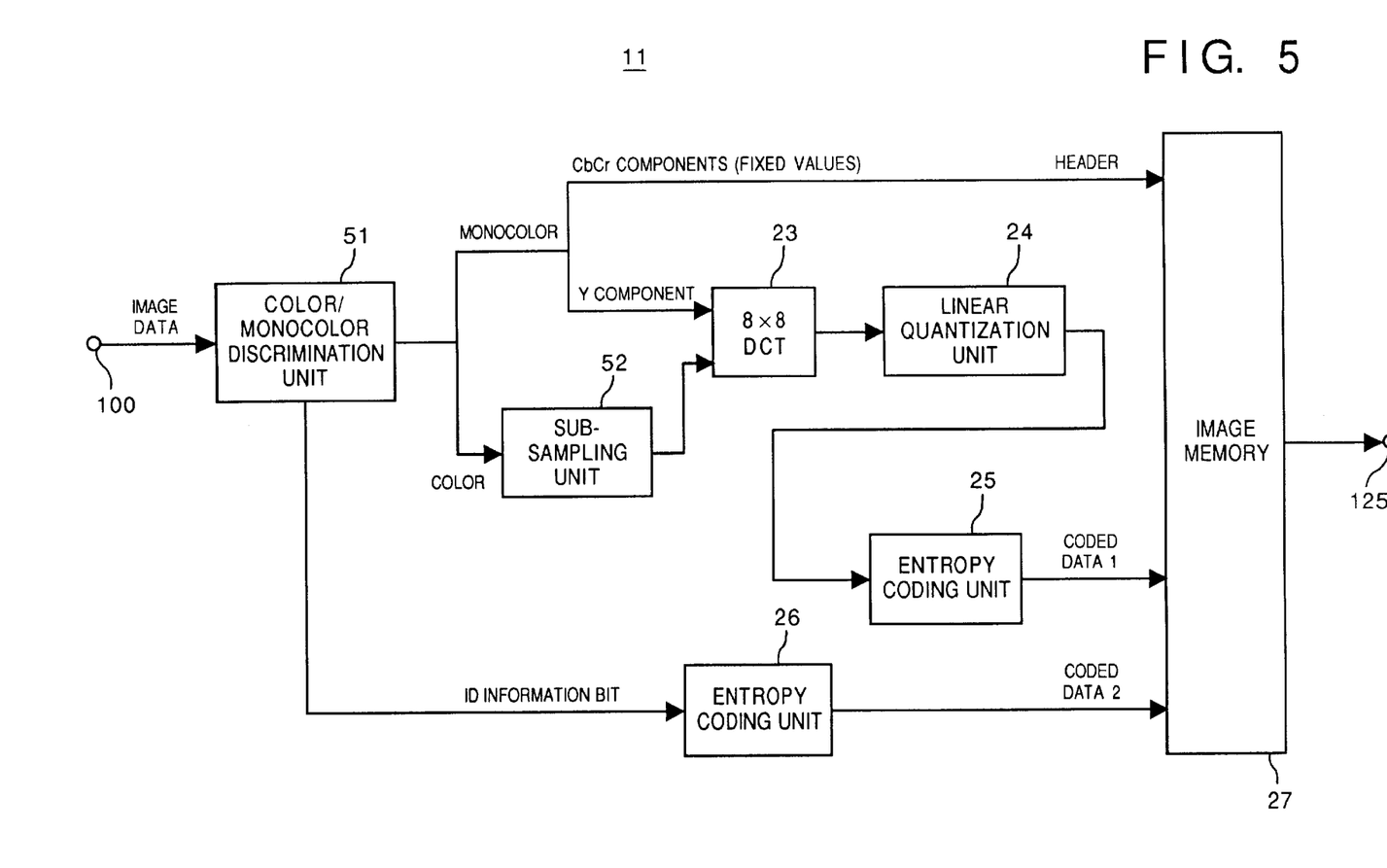
FIG. 5 is a block diagram illustrating the construction of the image memory unit 11 of FIG. 1 in accordance with a second embodiment.

FIG. 5 is a block diagram illustrating the construction of the image memory unit 11 in accordance with the present embodiment. In FIG. 5, the portions which are identical to those in the first embodiment have the same reference numerals, and the description is omitted here.

In FIG. 5, numeral 51 is a color/monocolor discrimination unit for dividing the input image data into blocks and discriminating whether each block is a color area or a monocolor area, and numeral 52 is a sub-sampling unit for sampling the data of each block at a given sub-sampling ratio.

In the embodiment, first, the color/monocolor area discrimination unit 51 divides the input image data into 16×8-pixel areas, each of which is composed of two DCT blocks (two 8×8-pixel areas) arranged in the horizontal direction, and discriminates whether each area is a monocolor area or color area. In this discrimination, characteristic such that values of Cb and Cr components are fixed values if each pixel of the input image data is a monocolor pixel is considered, and the area including a pixel which does not have any fixed value is determined as a color area.

Furthermore, as described in the first embodiment, a color/monocolor area can be discriminated by providing information on the color/monocolor area in advance by a preparation processing such as a manual input and the like.

The block data which is discriminated as a color area by the color/monocolor area discrimination unit 51 is input to the sub-sampling unit 52. The input data is subject to the sub-sampling in the sub-sampling unit 52 at the ratio Y:Cb:Cr=4:2:2, and input to the DCT unit 23. Subsequently, the coding is performed in the similar manner to the conventional technique.

On the other hand, in the data of a block which is discriminated as a monocolor area, the Cb and Cr components are not subject to the coding, and only the Y component is input into the DCT unit 23. Subsequently, the coding is performed in a similar way to the conventional technique. Since the Cb and Cr components will have fixed values, the coding is not performed on these components, and the fixed values are output to the image memory 27 as header information of the coded data. Furthermore, if an apparatus for coding and decoding recognizes those values in advance, those values are not added to the coded data.

The color/monocolor area discrimination unit 51 outputs the discrimination result to the entropy coding unit 26 as an ID discrimination bit (for example, if the value is "1", it indicates a "monocolor area", while if the value is "0", "color area"). Subsequently, the entropy coding unit 26 codes the result in the same manner as the first embodiment, thus the increase of information amount is suppressed by adding the ID information bit. The ID information is added to the coded data from the entropy coding unit 25 and is output to the image memory 27.

Accordingly, the processing of the monocolor area and that of the color area can be switched based on the ID information bit when the coded data is decoded.

According to this embodiment, the monocolor area and the color area are discriminated, and the conventional coding processing is performed on the color area, while the coding is performed only on the Y component on the monocolor area, and the obtained values of Cb, Cr components are directly output as header information.

Third Embodiment

In this embodiment, the input image whose color image is expressed by YCbCr is separated into black-and-white image areas and color image areas. The color information is cut off, while only the Y signal, the brightness signal, is coded in the black-and-while area. The color image data for the color area, on the other hand, is sub-sampled at the sub-sampling ratio Y:Cb:Cr=4:2:2, and is then coded.

Figure 6:
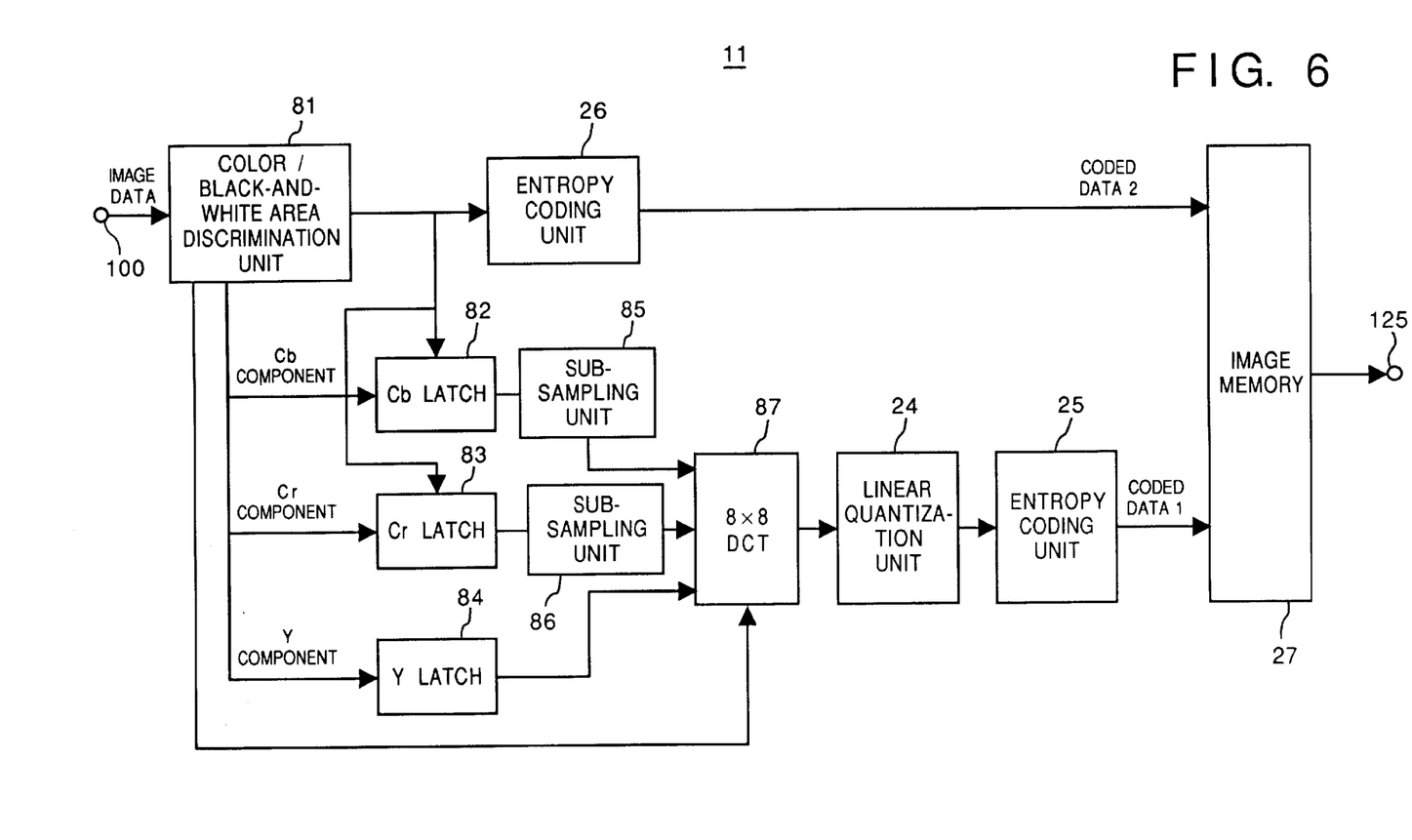
FIG. 6 is a block diagram illustrating the construction of the image memory unit 11 of FIG. 1 in accordance with a third embodiment.

FIG. 6 is a block diagram illustrating the construction of the image memory unit 11 in accordance with a third embodiment. In the construction shown in FIG. 6, the portions which are identical to those in the previous embodiments have the same reference numerals, and the description is omitted.

In FIG. 6, numeral 81 is a color/black-and-white area discrimination unit for dividing the input image data into blocks and discriminating whether each block is a color area or black-and-white area, numeral 82 is a latch circuit for holding the data of the Cb signal corresponding to the area of four blocks of the Y signal, numeral 83 is a latch circuit for holding the data of the Cr signal corresponding to the area of four blocks of the Y signal, and numeral 84 is a latch circuit for holding the data of the area of four blocks of the Y signal. Numerals 85–86 are sub-sampling units for sampling the held Cb and Cr signals at the given sampling ratio, and numeral 87 is a DCT unit for performing the DCT in the unit of an 8×8-pixel block by selecting the output from the latch circuit 84 and the sub-sampling units 85–86.

In the embodiment, first, the color/black-and-white area discrimination unit 81 divides the input image data into 16×16-pixel areas, and discriminates whether each area is a black-and-white area or color area. In this discrimination, the characteristic such that values of the Cb and Cr components approach "0" if each pixel of the input image data is a black-and-white pixel is considered, and the area including a pixel whose value is not close to "0" and greater than a predetermined value is determined as a color area.

Furthermore, as described in the previous embodiments, a color/black-and-white area can be discriminated by providing information on the color/black-and-white area in advance by the preparation processing such as by a manual input and the like.

The block data which is discriminated as a color area by the color/black-and-white area discrimination unit 81 are held in the latch circuits 82–84 based on the component, respectively. The signal data of the Y component held in the latch circuit 84 is directly input to the DCT unit 87 where the DCT is performed. The DCT coefficients obtained by the DCT unit 87 are quantized and coded as in the previous embodiments. On the other hand, the signal data of the Cb and Cr components are input into the sub-sampling units 85 and 86, respectively. Each input data is subject to the sub-sampling in the sub-sampling units 85 and 86 at the sub-sampling ratio Y:Cb:Cr=4:2:2. More particularly, ½ sub-sampling is performed in the main scanning direction of the printer engine. The sub-sampled data is input into the DCT unit 87, and subject to the DCT. Subsequently, the obtained DCT coefficients are quantized and coded as in the previous embodiments.

On the other hand, in the block data which is discriminated as a black-and-white area, the Cb and Cr components are not subject to the coding, and only the Y component is input to the DCT unit 87. Subsequently, the coding is performed in a similar manner to the color area. The Cb and Cr components are held in the latch circuits 82 and 83, but reading and coding are not performed on these components.

The color/black-and-white area discrimination unit 81 outputs the discrimination result to the entropy coding unit 26 and the DCT unit 87 as an ID discrimination bit (for example, if the value is "1", it indicates a "black-and-white area", while if the value is "0", "color area"). The DCT unit 87 selects input data, based on the ID discrimination bit. For example, if the value is "1", the DCT unit 87 selects only the Y component data as an input. Subsequently, the entropy coding unit 26 codes the result in the same manner as in the previous embodiments, and this coded information is added to the coded data from the entropy coding unit 25 and is output to the image memory 27.

Accordingly, the processing of a black-and-white area and that of color area can be switched based on the ID information bit when the coded data is decoded.

According to this embodiment, the black-and-white area and the color area are separated, and the conventional coding processing is performed on the color area, while the coding is performed only of the Y component on the monocolor area. In other words, the Cb, Cr components on the monocolor area are not coded. Accordingly, useless coding of Cb and Cr components can be avoided, and the coding amount is reduced. Thus the coding processing can greatly contribute to an efficient processing of a whole apparatus.

Fourth Embodiment

In the embodiment, the input image whose color space is expressed by YCbCr is separated into a monocolor area and a color area. It is noted that the monocolor area is a monochromatic and chromatic area in this embodiment. It is also noted that the color area is a chromatic area having a plurality of colors in this embodiment. The coding is performed on the monocolor area by restricting color information. On the color area, a sub-sampling is performed at the sub-sampling ratio Y:Cb:Cr=4:4:4 before the coding.

Figure 7:
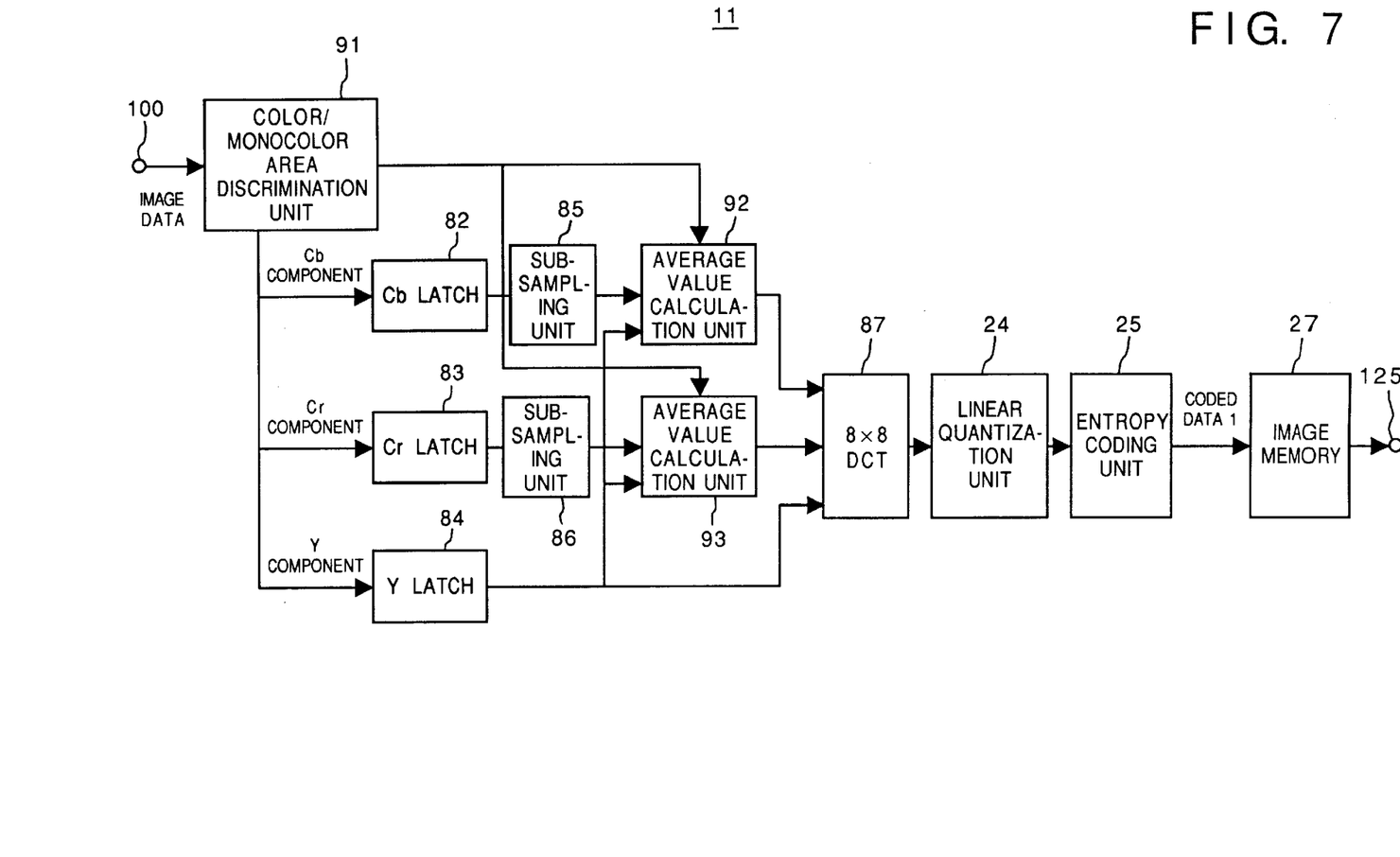
FIG. 7 is a block diagram illustrating the construction of the image memory unit 11 of FIG. 1 in accordance with a fourth embodiment.

FIG. 7 is a block diagram illustrating the construction of the image memory unit 11 in accordance with the present embodiment. In FIG. 7, the portions which are identical to those in the previous embodiments have the same reference numerals, and the description is omitted here.

In FIG. 7, numeral 91 is a color/monocolor discrimination unit for dividing the input image data into blocks and discriminating whether each block is a color area or monocolor area, numeral 92 is an average calculation unit for calculating an average of the Cb data of area of four blocks of the Y signal, and numeral 93 is an average calculation unit for calculating an average of the Cr data of area of four blocks of the Y signal.

In the embodiment, first, the color/monocolor area discrimination unit 91 divides the input image data into 16×16-pixel areas, and discriminates whether each area is a monocolor area or color area (which is also referred to as a "multichromatic area" since it indicates an image expressed by a plurality of colors). In this discrimination, the characteristic such that values of Cb and Cr components respectively approach fixed values (non-zero), if each pixel of the input image data is a monocolor pixel is considered, and the area including a pixel whose value does not approach the fixed value is discriminated as a color area.

According to this scheme, first, whether the area is an achromatic area or a chromatic area is discriminated based on the value of the Y component, because even if an achromatic pixel exists in the area, when the Y component (brightness) is considerably large or small, the area is discriminated as a white or black area regardless of the values of the Cb and Cr components. After the separation of chromatic pixels and achromatic pixels, average and dispersion values of the Cb and Cr components are obtained. If the dispersion value is small, the area is discriminated as a monocolor area, while if it is large, a color area.

Furthermore, as described in the previous embodiments, a color/monocolor area can be discriminated by providing information on the color/monocolor area in advance by the preparation processing such as by a manual input and the like.

The block data which is determined as a color area by the color/monocolor area discrimination unit 91 are respectively held in the latch circuits 82–84, based on each component. The signal data of the Y component held in the latch circuit 84 is directly input into the DCT unit 87 where the DCT is performed. The DCT coefficients obtained by the DCT unit 87 are quantized and coded as in the previous embodiments. On the other hand, the signal data of the Cb and Cr components are input into the average calculation units 92 and 93 via the sub-sampling units 85 and 86. However, average values are not calculated in the units 92 and 93, and the input data is directly input into the DCT unit 87 where the DCT is performed. Since the sub-sampling ratio is Y:Cb:Cr=4:4:4, sub-sampling in the sub-sampling units 85 and 86 is not actually performed. The data held in the latch circuits 82–83 are directly input into the average calculation units 92 and 93.

On the other hand, in the data of the block which is determined as a monocolor area, the data of the Y component is input into the DCT unit 87 where the coding is performed in a similar manner to the color area. On the other hand, the signal data of the Cb and Cr components are input into the average calculation units 92 and 93, via the sub-sampling units 85 and 86, which calculate the average of the chromatic pixels in the block and replace the pixel value by the average, respectively. In this embodiment, it goes without saying that sub-sampling is not performed. The signal data of the Cb and Cr components which are respectively replaced by the average values are input into the DCT unit 87, and the coding is performed in a similar manner to the color area. Accordingly, reproducibility in the monocolor area when the coded data is decoded can be improved.

According to this embodiment, the monocolor area and color area are separated, and the conventional coding processing is performed on the color area, while coding is performed on the Cb and Cr components in the monocolor area after replacing the pixel values by the average values. Accordingly, useless coding of noise included in the Cb and Cr components can be reduced. Thus, efficient coding processing can greatly contribute to an efficient processing of a whole apparatus. Furthermore, the fourth embodiment is advantageous in that an accurate color reproduction is performed, since an ID information bit is not generated, even if a decoder which cannot discriminate the bit is used.

Furthermore, in this embodiment, on the Cb and Cr components of the monocolor area, average values in the area are calculated by the average calculation units 92 and 93, and replace the pixel values in the area by the average values. However, this does not impose a limitation upon the invention. For example, the fact that the DC component of the output from the DCT unit 87 is the same as the average value is utilized, and the Cb and Cr components in the monocolor area are input into the DCT unit 87, instead being providing to the average calculation units 92 and 93, and all the AC components are replaced by "0" in the outputs of the DCT processing. This can also attain the same advantage as that in this embodiment.

Fifth Embodiment

In the embodiment, the input image whose color space is expressed by YCbCr is separated into monocolor areas and color areas. It is noted that the monocolor area and the color area have the same definition as that in the fourth embodiment. The coding is performed on the monocolor area by restricting color information. On the color area, the sub-sampling is performed at the sub-sampling ratio Y:Cb:Cr=4:4:4 before the coding.

Figure 8:
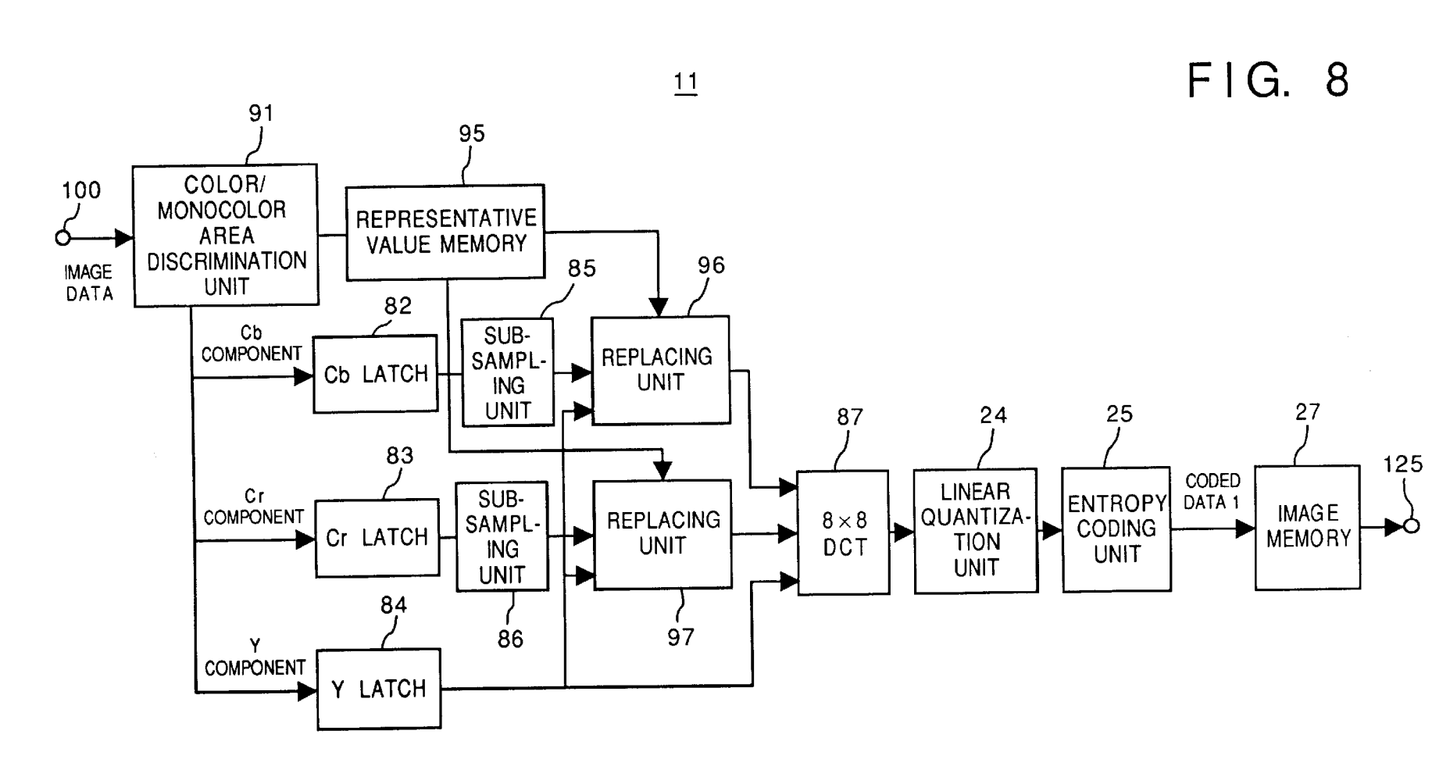
FIG. 8 is a block diagram illustrating the construction of the image memory unit 11 of FIG. 1 in accordance with a fifth embodiment.

FIG. 8 is a block diagram illustrating the construction of the image memory unit 11 in accordance with the embodiment. In FIG. 8, the portions which are identical to those in the previous embodiments have the same reference numerals, and the description is omitted here.

In FIG. 8, numeral 95 is a representative value memory for storing a single value or a plurality of values of Cb and Cr components expressing a chromatic color on the block determined as a monocolor area, and numerals 96 and 97 are replacing units for replacing the values of the Cb and Cr input from the latch circuits 82 and 83 by output values from the representative value memory 95.

The representative value memory 95 can store the representative value manually input or it can arbitrarily store the representative color based on the color information of the image displayed on the image display 14 by pre-scanning an objective image in the image input unit 10. For example, if the pre-scanned image is composed of black and red, red is stored.

The block data which is determined as a color area by the color/monocolor area discrimination unit 91 are held in each component in the latch circuits 82–84, respectively. The signal data of the Y component held in the latch circuit 84 is directly input into the DCT unit 87 where the DCT is performed. The DCT coefficients obtained by the DCT unit 87 are quantized and coded as in the previous embodiments. On the other hand, the signal data of the Cb and Cr components are input into the replacing units 96 and 97 bypassing the sub-sampling units 85 and 86 (the sub-sampling is not performed). However, the replacing process is not performed in the replacing units 96 and 97, and the input data is input into the DCT unit 87 where the DCT is performed. The obtained DCT coefficients are quantized and coded as in the previous embodiments.

On the other hand, in the data of the block which is discriminated as a monocolor area, the data of the Y component is input to the DCT unit 87 where the coding is performed in a similar manner to the color area. On the other hand, the signal data of the Cb and Cr components are input into the replacing units 96 and 97, bypassing the sub-sampling units 85 and 86. In the replacing units 96 and 97, the input values of each pixel are respectively replaced by the representative values which are output from the representative value memory 95. This replaced signal data of the Cb and Cr components are input to the DCT unit 87, and the coding is performed in a similar manner to the color area.

According to this embodiment, the monocolor area and color area are separated, and the conventional coding processing is performed on the color area, while the coding is performed on the Cb and Cr components in the monocolor area after replacing the pixel values by the representative values. Accordingly, useless coding of the noise included in the Cb an Cr components can be reduced. Thus, the coding processing can greatly contribute to an efficient processing.

More specifically, a uniform color space such as CIE 1976 L*a*b* or CIE 1976 L*u*v* can be employed as the color space besides the YCrCb space described above. Furthermore, the configuration of the image memory 27 can be a frame memory for storing coded data for one picture frame, or a buffer memory for storing coded data (e.g., DCT coded data) which corresponds to a divided portion (e.g., 16 lines) of one picture frame.

The present invention is not limited to the first to fifth embodiment in the color space of the input image, as an orthogonal transform scheme, a block size in the orthogonal transform and an area size for color/monocolor discrimination may be utilized.

The present invention can be applied to a system constituted by a plurality of devices, or to an apparatus comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus comprising:
   input means for inputting color image data;
   determination means for determining whether or not the color image data represents a monocolor image having a chromatic color;
   encoding means for extracting spatial frequency components of a chromaticity component from the color image data and encoding the spatial frequency components; and
   control means for controlling the encoding processing by said encoding means based on the determination by said determination means so that AC components of the spatial frequency components become zero (0).

2. The apparatus according to claim 1, wherein said control means makes all of the AC components zero.

3. The apparatus according to claim 1, wherein said control means includes:
   average calculation means for calculating an average of the data of the chromaticity component in a block obtained by dividing the color image data input by said input means; and
   replacing means for replacing the data value of the chromaticity component in the block by the average value calculated by said average calculation means.

4. The apparatus according to claim 1, wherein said control means includes:
   storage means for storing a representative value of the chromaticity component; and
   replacing means for replacing the data value of the chromaticity component in a block obtained by dividing the color image data input by said input means by the representative value stored in said storing means.

5. A color image processing method comprising:
   an input step of inputting color image data;
   a determination step of determining whether or not the color image data represents a monocolor image having a chromatic color;
   an encoding step of extracting spatial frequency components of a chromaticity component from the color image data and encoding the spatial frequency components; and
   a control step of controlling the encoding processing in said encoding step based on the determination result in said determination step so that AC components of the spatial frequency components become zero (0).

6. A color image processing apparatus comprising:
   input means for inputting color image data including color image data representing a monocolor image having a chromatic color;
   encoding means for extracting spatial frequency components of a chromaticity component from the color image data and for encoding the spatial frequency components; and
   control means for controlling encoding processing by said encoding means so that AC components of the spatial frequency components extracted and encoded from the color image data representing the monocolor image having the chromatic color become less than AC components of spatial frequency components extracted and encoded from color image data representing a color image other than the monocolor image.

7. A color image processing apparatus according to claim 6, wherein the input color image data includes a first position representing the monocolor image having the chromatic color and a second portion representing the color image other than the monocolor image.

8. A color image processing method comprising:
   an input step of inputting color image data including color image data representing a monocolor image having a chromatic color;
   an encoding step of extracting spatial frequency components of a chromaticity component from the color image data and encoding the spatial frequency components; and a control step of controlling encoding processing in said encoding step so that AC components of the spatial frequency components extracted and encoded from the color image data representing the monocolor image having the chromatic color become less than corresponding spatial frequency components extracted and encoded from color image data representing a color image other than the monocolor image.

\* \* \* \* \*

UNITED STATES PATENT AND TRADEMARK OFFICE
CERTIFICATE OF CORRECTION

| | | |
|---|---|---|
| PATENT NO. | : 6,486,981 B1 | |
| APPLICATION NO. | : 08/887426 | |
| DATED | : November 26, 2002 | |
| INVENTOR(S) | : Shimura et al. | |

It is certified that error appears in the above-identified patent and that said Letters Patent is hereby corrected as shown below:

TITLE PAGE, ITEM [54] TITLE AND COL. 1

"COLOR IMAGE PROCESSING METHOD AND APPARATUS THEREOF" should read --COLOR IMAGE PROCESS METHOD AND APPARATUS THEREOF--.

TITLE PAGE, ITEM [56] REFERENCES CITED

Foreign Patent Documents
"04323964 A" should read --4-323964 A--.
"05048909 A" should read --5-48909 A--.
"05284371 A" should read --5-284371 A--.
"07046410 A" should read --7-46410 A--.
"07050758 A" should read --7-50758 A--.
"07143349 A" should read --7-143349 A--.
"07143838 A" should read --7-193838 A--.

COLUMN 1

Lines 1-2, "COLOR IMAGE PROCESSING METHOD AND APPARATUS THEREOF" should read --COLOR IMAGE PROCESS METHOD AND APPARATUS THEREOF--.
Line 16, "is," should read --is--.

COLUMN 2

Line 59, "he" should read --the--.

COLUMN 5

Line 25, "(Note" should read --(note--.

UNITED STATES PATENT AND TRADEMARK OFFICE
CERTIFICATE OF CORRECTION

PATENT NO. : 6,486,981 B1
APPLICATION NO. : 08/887426
DATED : November 26, 2002
INVENTOR(S) : Shimura et al.

It is certified that error appears in the above-identified patent and that said Letters Patent is hereby corrected as shown below:

COLUMN 7

Line 6, "the" ($2^{nd}$ occurrence) should read --a--.

COLUMN 8

Line 58, "of" should read --on--, and "on" should read --of--.

COLUMN 11

Line 2, "are" should read --is--.

COLUMN 12

Line 55, "position" should read --portion--.

Signed and Sealed this

Twenty-fourth Day of February, 2009

JOHN DOLL
*Acting Director of the United States Patent and Trademark Office*